May 22, 1962    L. N. BRAMLEY    3,036,253
MANUAL AND AUTOMATIC POSITION CONTROL SYSTEMS
Filed Nov. 1, 1957    4 Sheets-Sheet 1

INVENTOR
LIONEL NAPIER BRAMLEY
BY Hause and Nydick
ATTORNEYS

May 22, 1962   L. N. BRAMLEY   3,036,253
MANUAL AND AUTOMATIC POSITION CONTROL SYSTEMS
Filed Nov. 1, 1957   4 Sheets-Sheet 2

INVENTOR
LIONEL NAPIER BRAMLEY
BY Hane and Nydick
ATTORNEYS

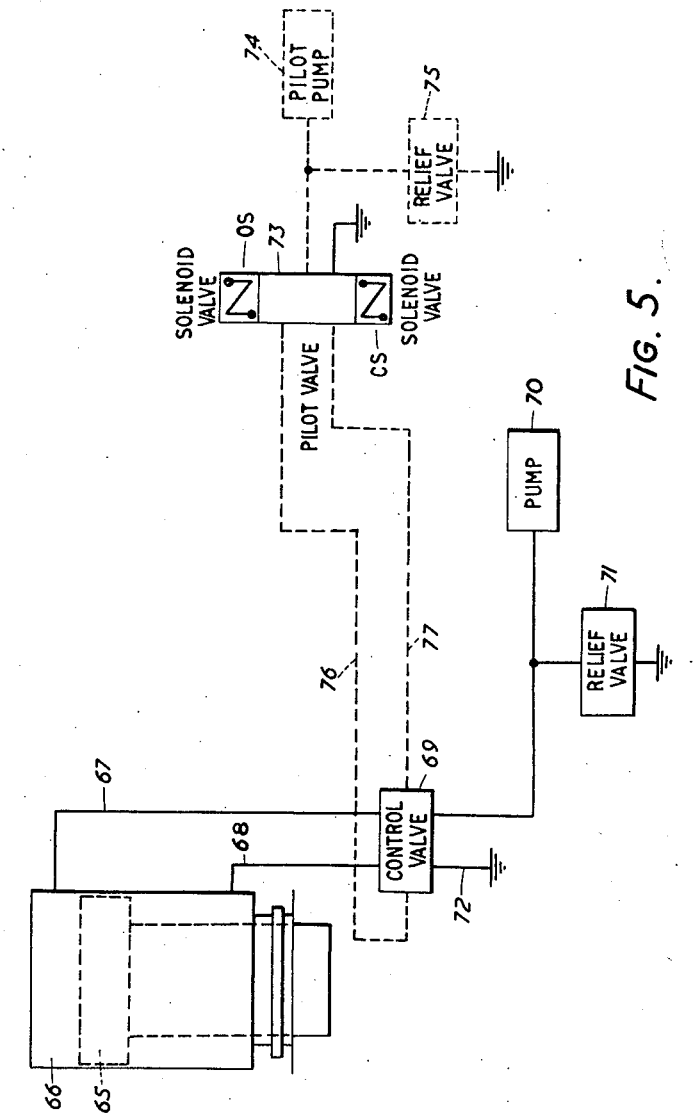

United States Patent Office 3,036,253
Patented May 22, 1962

3,036,253
MANUAL AND AUTOMATIC POSITION
CONTROL SYSTEMS
Lionel Napier Bramley, Farnborough, England, assignor to The British Iron & Steel Research Association, London, England
Filed Nov. 1, 1957, Ser. No. 694,050
7 Claims. (Cl. 318—29)

This invention relates to control systems particularly for adjusting the value of a controllable variable quantity, such as the position of a movable member, sequentially to two or more prescribed values. An example of the application of such a control system is a forging press, where the forging press must be reciprocated between an accurately defined lower position which determines the thickness of the forging, and an upper position separated from the lower position by a stroke sufficient to permit the element to be forged to enter and to be manipulated between the press members.

The invention resides in a control system for the purpose defined, in which system signals are generated in accordance with the value of the quantity and the prescribed valves, the signal in accordance with the value of the quantity is compared in turn with each of the signals in accordance with the prescribed values, and the quantity is controlled by the results of each comparison to bring the value of the quantity to each of the prescribed values in turn.

The system may be operated on a timed cycle, switching of the prescribed signals for comparing them with the signal according to the value of the quantity being automatically effected at intervals preset according to the times required for the value to be shifted from each prescribed value to the next.

Figure 1:
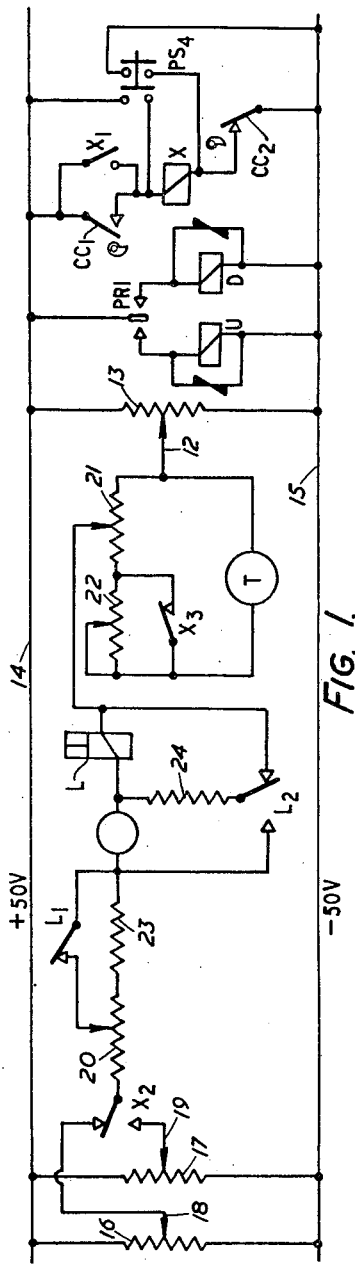
Figure 6:
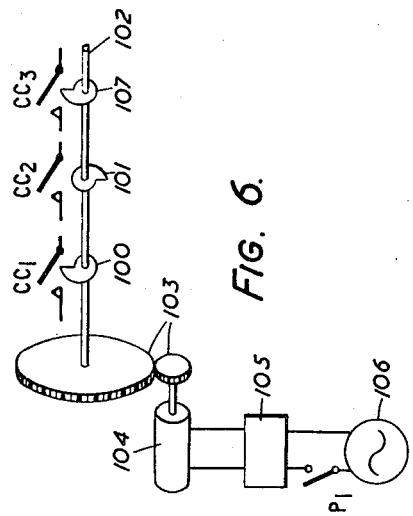
Figure 2:
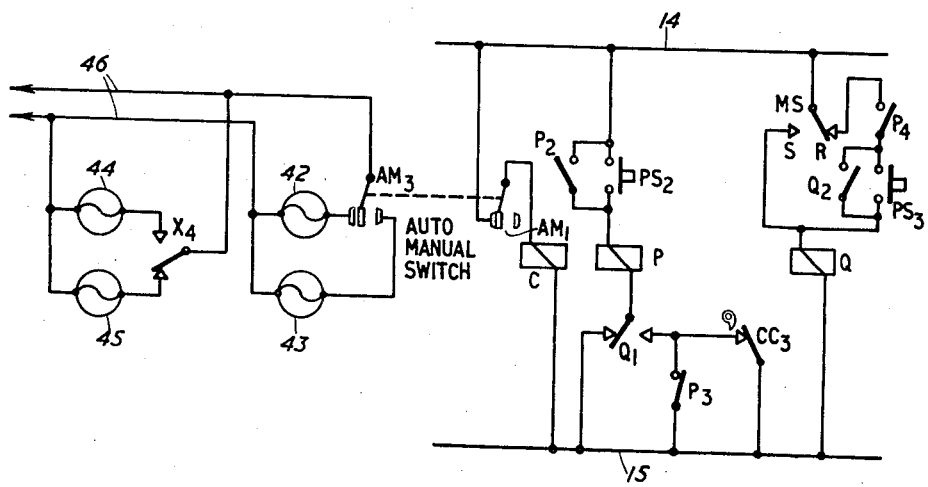
Figure 3:
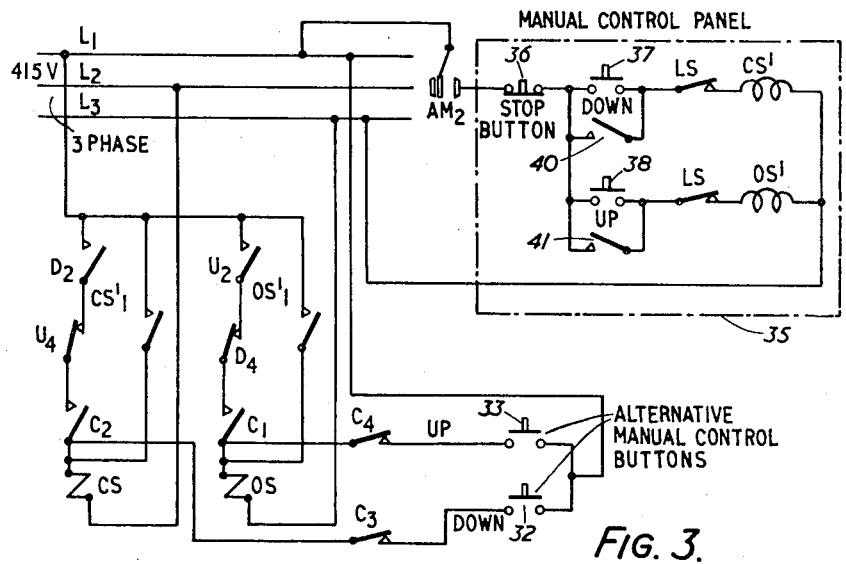
Figure 4:
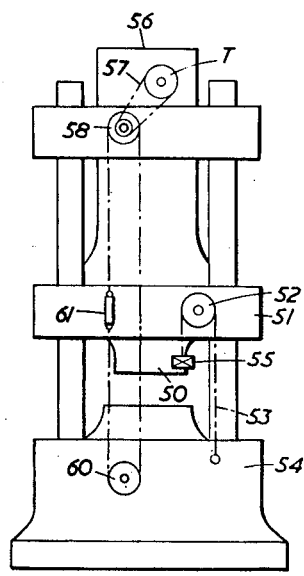

The invention will be more readily understood from the following description of a control system in accordance therewith, reference being made to the accompanying drawings, in which FIGURES 1, 2 and 3 are circuit diagrams of the control system,
FIGURE 4 schematically illustrates a forging press the operation of which the control system controls,
FIGURE 5 schematically shows a known hydraulic control apparatus for the forging press,
FIGURE 6 illustrates the timing mechanism employed in the system of FIGURES 1 and 2.

The control system illustrated in the drawings is intended for controlling the movement of the movable press-member 50 (FIGURE 4) of the forging press shown in FIGURES 4 and 5.

Movement of the press-member is effected by means of the known hydraulic control apparatus shown in FIGURE 5. This apparatus will later be described in detail, but, briefly, it includes a solenoid valve 73 (FIGURE 5) having windings OS and CS (FIGURES 3, 5). The arrangement is such that when winding OS is energized the press-member is caused to move upwards, while when winding CS is energized the press-member is caused to move downwards.

The control apparatus to be described includes means for automatically reciprocating the press-member between predetermined upper and lower limits, and also includes means for controlling manually the movement of the press-member.

Where the press-member is to be automatically reciprocated, the manually operable switches AM1 (FIGURE 2), AM2 (FIGURE 3) and AM3 (FIGURE 2) are set to the left-hand positions, as shown in the drawings. If repeated reciprocation is required, then the manually operable switch MS (FIGURE 2) is set to the position R, while if the switch MS is set to the position S, then the press-member completes a single reciprocation only.

The arrangement is such that the press-member is normally at rest at the predetermined upper limit. If the switch MS is set to R, then repeated reciprocation is commenced by operation of push-button PS2 (FIGURE 2): the press-member will then automatically move cyclically between the predetermined upper and lower limits, until such time as push-button PS3 (FIGURE 2) is operated, whereafter the press-member will come to rest the next time it reaches the predetermined upper limit.

Where the switch MS is set to S, and thereafter push-button PS2 is operated, the press-member will automatically reciprocate once, moving from the upper limit to the lower limit and then back to the upper limit where it comes to rest.

The automatic reciprocation of the press-member is effected by suitable energization by the control system of the windings CS and OS, in response to electrical signals generated by apparatus associated with the press-member and which generates electrical signals indicative of the instantaneous position and velocity of the press-member.

The electrical position signal is derived from the slider 12 of a rotary-type potentiometer 13 (FIGURE 1), the slider 12 being secured to a sprocket wheel 52 (FIGURE 4) which is arranged, as to be described, to rotate with movement of the press-member.

The electrical velocity signal is derived from a tacho-generator T (FIGURES 1, 4) the rotor of which is arranged, in a manner to be described, to rotate with movement of the press-member.

The electrical circuit of FIGURE 1 is a comparison circuit, and includes a polarized relay having a winding PR arranged, in a manner to be described, to compare the electrical position and velocity signals just referred to, alternately with an electrical signal derived from the slider 19 of a potentiometer 17 and representing the predetermined lower limit of the press-member, and with an electrical signal derived from the slider 18 of a potentiometer 16 and representing the predetermined upper limit of the press member.

The automatic reciprocation is effected under the control of the timing mechanism (FIGURE 6) which includes a number of cams arranged to cyclically operate a number of electrical contacts. The timing mechanism includes an electric motor 104 the speed of which is adjustable by a speed regulator 105, so that the period of the cyclic operation can be varied as required.

The arrangement will now be described in detail.

Referring to FIGURE 1, the press-member is coupled to the slider 12 on the potentiometer 13 which is connected across the supply lines 14, 15. The voltage of the slider 12 is then proportional to the position of the press-member. The upper and lower limits of movement of the press-member are set by the potentiometers 16, 17 respectively, the sliders 18, 19 of which are adjusted to the respective desired values; as shown potentiometers 16, 17 are also connected across supply lines 14, 15.

Sliders 18, 19 are connected to opposite poles of a switch $X_2$ formed by the contacts of a relay having a winding X. The moving contact of contacts $X_2$ is connected to a polarised relay having a winding PR through a voltage divider 20 and contacts $L_1$. By these means the voltage of slider 18, or of slider 19, is applied to relay winding PR and this voltage is opposed by the voltage of potentiometer 13, the slider 12 of which is connected through a voltage divider 21 to the relay winding PR.

A tacho-generator T is also coupled to the element to be controlled and produces a voltage proportional to the speed of movement of the element. This voltage is applied, either through contacts $X_3$ of relay winding X or, when contacts $X_3$ are open, through potentiometer 22, to voltage divider 21 so as to back off the position-representing voltage from potentiometer 13.

The sensitive relay having a winding PR is protected from overloads by a relay having a winding L which is connected in series with relay winding PR. The relay having the winding L has the beforementioned contacts $L_1$ which normally short circuit a resistor 23 and contacts $L_2$ which connect a resistor 24 across either relay winding L or relay winding PR. When the current flow becomes excessive relay winding L is energised and contacts $L_1$, $L_2$ are moved from the positions shown in order to introduce series resistance and in order to shunt relay winding PR.

The polarized relay having a winding PR has contacts forming a center-stable two-pole switch PR1 which, in one position, causes energisation of the winding U of an "Up" relay controlling movement upwards of the element and, in the other position, causes energisation of the winding D of a "Down" relay which controls downward movement.

The relay winding X is connected between normally open cam-operated contacts CC1 and normally closed cam-operated contacts CC2 (FIGS. 1 and 6). Contacts CC1, CC2 are also connected to supply lines 14, 15 respectively. Hold contacts $X_1$ of the relay having the winding X are connected across contacts CC1.

As shown in FIGURE 6, contacts CC1, CC2 are operated by cams 100, 101 carried on a shaft 102 which is driven through reduction gears 103 by an adjustable speed electric motor 104. Motor 104 is energised through a speed regulator 105 and contacts $P_1$ from an A.C. source 106. On each revolution of shaft 102, contacts CC1 are momentarily closed by cam 100 at the beginning of the operating cycle and contacts CC2 are momentarily opened subsequently in the cycle after a time period sufficiently long to enable the press-member to move from the upper limit to the lower limit.

The movement of the press-member is regulated by two servo-motors, the windings of which are shown at CS and OS of FIGURE 3, winding CS controlling downward motion and OS upward motion. Winding CS is connected in series with contacts $C_2$ of the relay having winding C (FIG. 2), normally closed contacts $U_4$ of the relay winding U, and normally open contacts $D_2$ of the relay having winding D across one of the phases of a 3-phase supply $L_1$, $L_2$, $L_3$. Similarly, winding OS is connected in series with contacts $C_1$ of the relay having winding C, normally closed contacts $D_4$ of the relay D and normally open contacts $U_2$ of relay U across another phase of the supply. Windings CS and OS are alternatively energisable by hand through contacts $C_3$ and down button 32, and through contacts $C_4$ and up button 33, respectively.

For the automatic control of the element, ganged switches $AM_1$, $AM_2$, $AM_3$ are placed in the left hand positions shown. This has the effect of energising relay C and consequently of closing contacts $C_1$, $C_2$ and opening contacts $C_3$, $C_4$. When the switches are in their manual positions, the relay having winding C is deenergised and contacts $C_3$, $C_4$ close to enable the servo-motors to be controlled by buttons 32, 33.

During automatic control, the apparatus performs a cycle of operations in which the position-representing voltage from potentiometer 13 is compared with the bottom-limit signal from potentiometer 17, the relay having winding D is energised to cause downward motion of the press-member until the signal applied to relay winding PR becomes zero, the relay having a winding A changes over so that the voltage from potentiometer 13 is compared with that from potentiometer 18, and relay winding U is energised to cause upward motion of the element until the signal applied to relay winding PR becomes zero again.

At the start of the operating cycle, the momentary closing of contacts CC1 causes energisation of relay winding X and the consequential closing of a holding circuit for relay winding X in parallel with contacts CC1. The energisation of relay winding X also changes over contacts $X_2$ so that the lower limit potentiometer 19 is connected to detector relay winding PR and relay winding D is energised to initiate downward movement through the circuit of FIGURE 3. The press-member is brought to rest at the lower limit by the deenergisation of relay winding PR and remains there until contacts CC2 are momentarily opened. When this happens, relay winding X is deenergised and contacts $X_1$ reopen so as to keep the relay winding deenergised until contacts CC1 are closed in the next cycle. Deenergisation of relay winding X causes contacts $X_2$ to change over and connect the upper limit potentiometer 18 to relay winding PR. Relay winding U is now energised to cause the press-member to be driven to the upper limit where it is halted by the deenergisation of relay winding PR and remains until the next cycle is initiated by the closing of contacts CC1.

The control of motor 104 by contacts $P_1$ is illustrated in FIGURE 2 where relay winding P is shown as connected in series with push-button contacts PS2 and change-over contacts $Q_1$, between supply lines 14, 15. Normally open contacts $P_2$ of the relay having the winding P are connected in parallel with contacts PS2 to provide a hold circuit. The other fixed contact of change-over contacts $Q_1$ is connected to line 15 through normally closed contacts $P_3$ of the relay having winding P and normally closed cam operated contacts CC3. Contacts CC3 are operated by a cam 107 also carried on shaft 102 so that the contacts are momentarily opened at the end of each cycle.

Change-over contacts $Q_1$ appertain to a relay having a winding Q which is connected between line 15 and a fixed contact S of a manually operated switch MS. The moving contact is connected to line 14 and the other fixed contact R is connected to normally open contacts $P_4$ of a relay having a winding P, and normally open push button contacts PS3 in series. Contacts PS3 are also connected to relay winding Q and contacts $Q_2$ of the relay having winding Q are connected across contacts PS3.

Switch MS is placed in the S position for single cycle operation and in the R position when it is desired that the apparatus should perform repeated cycles. When the switch MS is in the S position, relay winding Q is energised and switch $Q_1$ is changed to the right hand position. When start button PS2 is pressed, a circuit is completed from line 14, through contacts PS2, relay winding P, contacts $Q_1$ and closed contacts $P_3$. Relay winding P is energised to complete a holding circuit through contacts $P_2$ and to energise motor 104 through contacts $P_1$. When motor 104 starts moving, contacts CC3 have returned to their normal closed position and relay winding P remains energised through contacts $P_2$ and CC3. At the end of the cycle, contacts CC3 open, relay winding P is deenergised and motor 104 stopped. Thus each time push button contacts PS2 are closed, the shaft 102 is driven through one revolution during which time the press-member is driven from the upper limit to the lower limit and back to the upper limit.

When switch MS is in the R position, relay winding Q is normally deenergised and switch $Q_1$ is in the position shown. When start button PS2 is pressed, relay winding P is energised and is held energised by hold contacts $P_2$. The motor 104 continues to rotate continuously until the stop button PS3 is pressed and, during each revolution of shaft 102, the press-member is reciprocated between the upper and lower limits. When stop button PS3 is pressed, a circuit is completed through contacts P₄ and PS3 to relay winding Q which thereby is energised and completes a holding circuit for itself through contacts Q₂. The change over of contacts Q₁ causes the circuit to revert to the condition for single reciprocations, and the relay winding P is deenergized and motor 104 stopped at the end of cycle in which stop button PS3 is pressed.

Manual control by the buttons 32, 33 when switches AM₁, AM₂ and AM₃ are in their right hand positions and relay winding C is deenergised is believed to be immediately obvious from FIGURE 3. This figure also shows a control panel 35 which can be used for manual control in place of buttons 32, 33. Switch AM₂ is connected to line L₁ and through the normally closed contacts 36 of a stop button to the contacts 37, 38 of an up button and a down button respectively. These contacts 37, 38 are connected in parallel to contacts 36 and are also connected separately to the windings CS¹, OS¹ of intermediate relays and then to line L₃. Contacts 40, 41 are connected across contacts 37, 38 and are closed on appropriate operation of the intermediate relays. The relays having windings CS¹, OS¹ have contacts CS₁¹, OS₁¹, in series with the windings CS, OS of the servo-motors, so that buttons 37, 38 control the servo-motors.

Indication of operation of the apparatus is given by the indicator lamps shown in FIGURE 2. Lamps 42, 43 indicate automatic and manual operation respectively and are connected to opposite poles of switch AM₃. Lamps 44, 45 indicate that the element is approaching or is at the bottom limit and top limit respectively and are connected to the fixed contacts of contacts X₄ of relay X₁. All the lamps are energised from low voltage, A.C. supply lines 46.

As is now apparent, potentiometers 16 and 17 determine the upper and lower limits of the press-member. The windings CS, OS are the windings of valves controlling the flow of liquid under pressure to the press to cause the press-member to fall and rise respectively and the slider 12 and the tacho-generator T are coupled to the press-member so that the voltages derived therefrom are dependent on the position and velocity of the press-member. Such a press and a hydraulic control system therefor are illustrated in FIGURES 4 and 5. In FIGURE 4 the moving press member 50 is carried on a cross head 51 which also carries the position potentiometer 12 (FIG. 1) with its slider 13, this potentiometer being of the rotary type. The slider 12 is connected to a sprocket 52 over which a chain 53 passes. Chain 53 is secured at one end to the base 54 of the press and carries at the other end a weight 55, so that the angular position of the sprocket 52 is determined by the position of the cross head 51 relative to the base 54.

The tacho-generator T is carried on the fixed head 56 of the press and is driven through chain 57 from a sprocket 58. Sprocket 58 is in turn driven by chain 59 which passes round a sprocket 60 on the base 54 and which is attached at 61 to the moving cross head 51. When the cross head 51 moves the tacho-generator T is driven at a speed proportional to the speed of the cross head.

FIGURE 5 illustrates the hydraulic control system of the press. A piston 65 works in a cylinder 66 and is coupled to the press member 50 and cross head 51. Liquid under pressure can be supplied to the cylinder above or below the piston through lines 67, 68 respectively. The supply of liquid to lines 67, 68 is controlled by a control valve 69 which is also connected to a pump 70 provided with a pressure relief valve 71 and to a discharge passage 72.

Valve 69 is of known type and is itself controlled hydraulically by a solenoid valve 73 having the windings OS, CS. Valve 73 is supplied with liquid under pressure through pilot pump 74 which has the usual pressure relief valve 75 to maintain a constant pressure.

Energistation of winding OS causes liquid under pressure to pass through a pipe 76 and to operate valve 69 so that liquid from pump 70 is supplied below the piston 65 through pipe 68; at the same time pipe 67 is connected to the discharge passage 72 and the press opens. Similarly, energisation of winding CS operates valve 69 through a pipe 77 to apply liquid from pump 70 to pipe 67 and to connect pipe 68 to the discharge passage 72; this has the effect of causing the piston 65 to descend and to close the press.

It will be observed that the arrangement of contacts X₃ and voltage divider 22 is such that a larger velocity feedback signal is applied to the polarized relay winding PR while the element is moving upwards than when it is moving downwards. This is because the final downward movement of the press-member of a forging press is resisted by deformation of the metal being forged so that the press-member is less likely to over-run at the bottom limit than at the top limit.

Changes in the length of travel of the press member and in the time required to operate manipulators and the like when the press-member reaches its upper limit affect the operation of the system, since the overall cycle time and the time for individual operations in a cycle must be kept to a minimum compatible with the proper operating of the system. Changes in the length of travel are accommodated by adjusting cam 101 on shaft 102 until contacts CC2 are operated at the required time after contacts CC2. Changes in the overall cycle time are effected by adjusting the speed of the motor 104 by the regulator 105.

When the control system is applied to a fast acting press, it may be that the circuit as described above will be too slow for single cycle operation since the motor 104 is each time required to accelerate from rest. In this case, a simple manual control may be employed through the push-button PS4. Push button PS4 when pressed completes a circuit through relay winding X and causes switch X₂ to take up its lower position. When the operator sees that the press member has been driven to its lower limit, he releases the button PS4, whereupon switch X₂ changes over and the press member is driven to its upper position.

Where manipulation of the ingot being forged or other ancillary operation is to be effected automatically, control may be exerted at the requisite time or times by further cams on shaft 102.

It is to be understood that the timing circuits employing the motor 104 and the cams CC1, CC2, CC3 may be replaced by an electronically operated timing circuit, using for example multivibrator and flip-flop circuits. Electronic timing circuits employing transistors or conventional tubes have the advantage that the timing can easily be altered without interrupting the operation of the press.

When other elements are required to be controlled, it may be desirable for the element to be brought successively to each of three or more successive positions or values. It will be immediately obvious how the system described may be effected to bring this about.

It will be immediately apparent that the control system described may be employed for the control of any variable, the value of which can be adjusted as desired. The slider of potentiometer 13 is positioned by the value of the variable and the servo-motor controlled by windings CS, OS drives the variable in each of two opposite directions. The servo-motor takes any form which is convenient to the variable being controlled and may be an electric-motor operated by contactors, a hydraulic motor or the like.

I claim:

1. A control system for adjusting the value of a variable quantity automatically and alternately to two prescribed values, which system comprises means for generating a first electrical signal, the magnitude of which is in accordance with the value of the quantity, means for generating two datum signals, the magnitudes of which are respectively in accordance with said prescribed values, comparing means to which said first signal is applied, switching means to which said datum signals are applied and which applies the datum signals singly to said comparing means, a timing device for operating said switching means so that said first signal is compared alternately with each of said datum signals and after timing intervals controlled by said timing device and sufficient to enable said quantity to be brought sequentially to said prescribed values, and means controlled by said comparing means for varying the value of said quantity alternately to said prescribed values.

2. A control system for a forging press comprising a press member to be reciprocated between an upper prescribed limit and a lower prescribed limit, means for generating a first electrical signal, the magnitude of which is in accordance with the position of said press member, means for generating first and second datum signals, the magnitudes of which are respectively in accordance with the positions of said upper and lower limits, comparing means to which said first signal is applied, switching means to which said datum signals are applied and which applies said datum signals singly to said comparing means, a timing device for operating said switching means so that said first signal is compared alternately with each of said datum signals and after timing intervals controlled by said timing device and sufficient to enable said press member to be brought sequentially to the positions of said upper and lower limits, and means controlled by said comparing means for varying the position of said press member alternately to said upper and lower limits.

3. A control system according to claim 2 in which the signal generating means are potentiometers, one of which is controlled by the position of the press member and the others of which are settable according to the desired positions between which the press member is to reciprocate.

4. A control system according to claim 1 in which the comparing means is a relay to which the difference of the first electrical signal and the selected datum signal is applied and which has a switch with two stationary contact members which are alternatively engaged according to the sense of the current through the relay and neither of which is engaged for negligible current through the relay.

5. A control system for adjusting the value of a variable quantity automatically and sequentially to two prescribed values, said control system comprising means for generating a first electrical signal the magnitude of which is in accordance with the value of the quantity, means for generating two electrical datum signals the magnitudes of which are respectively in accordance with the two prescribed values, a relay to which the first signal is applied, a switching means to which the datum signals are applied and which applies the datum signals singly to said relay in opposition to said first signal, a timing device for operating the switching means so that the first signal is compared by said relay alternately with each of the datum signals after timing intervals controlled by the timing device and sufficient to enable the quantity to be brought alternately to the prescribed values, said relay having a switch with two stationary contact members which are alternatively engaged according to the sense of the current through the relay and neither of which is engaged for negligible current through the relay, and a further relay connected to each of the stationary contact members, said further relays controlling adjustment of the variable quantity in opposite directions, whereby the value of said variable quantity is brought alternately to said prescribed values.

6. A control system for adjusting the value of a variable quantity automatically and sequentially to two prescribed values, said control system comprising means for generating a first electrical signal the magnitude of which is in accordance with the value of the quantity, means for generating two electrical datum signals the magnitudes of which are respectively in accordance with the two prescribed values, a comparing means to which the first signal is applied, a switching means to which the datum signals are applied and which applies the datum signals singly to the comparing means, a timing device comprising at least one cam-operated electrical switch, for operating the switching means so that the first signal is compared alternately with each of the datum signals after timing intervals controlled by the timing device and sufficient to enable the quantity to be brought alternately to the prescribed values.

7. A control system according to claim 6 in which several cam-operated electrical switches are provided and the timing device comprises a plurality of electrical switches, each having an operating cam, said cams being carried on a rotatable shaft and the relative settings of the cams on the shafts are adjustable.

References Cited in the file of this patent

UNITED STATES PATENTS

| | | |
|---|---|---|
| 2,173,798 | Baak | Sept. 19, 1939 |
| 2,290,626 | Bosomworth | July 21, 1942 |
| 2,486,295 | King | Oct. 25, 1949 |
| 2,508,162 | Herwald | May 16, 1950 |
| 2,508,639 | Field | May 23, 1950 |
| 2,630,552 | Johnson | Mar. 3, 1953 |
| 2,715,703 | Shuck | Aug. 16, 1955 |
| 2,716,208 | Coffin | Aug. 23, 1955 |
| 2,734,155 | Shuck | Feb. 7, 1956 |
| 2,769,123 | Fegely | Oct. 30, 19756 |
| 2,769,124 | Erbe | Oct. 30, 1956 |
| 2,786,174 | Askew | Mar. 19, 1957 |
| 2,801,799 | McCulloch | Aug. 6, 1957 |
| 2,827,602 | Horsfall et al. | Mar. 18, 1958 |
| 2,889,507 | Kennedy et al. | June 2, 1959 |
| 2,922,053 | Steel | Jan. 19, 1960 |

FOREIGN PATENTS

| | | |
|---|---|---|
| 494,593 | Great Britain | Oct. 28, 1938 |